United States Patent
Sawano et al.

[11] Patent Number: 6,142,625
[45] Date of Patent: Nov. 7, 2000

[54] TORIC MULTIFOCAL LENS HAVING DIFFERENT ASTIGMATISM CORRECTIVE OPTICAL POWERS IN RESPECTIVE VISION CORRECTION REGIONS, AND METHOD OF PRODUCING THE SAME

[75] Inventors: Tadashi Sawano, Aichi-ken; Hiroyuki Oyama, Kakamigahara; Hideaki Kondou, Okazaki; Yuuzi Gotou, Kakamigahara, all of Japan

[73] Assignee: Menicon Co., Ltd., Nagoya, Japan

[21] Appl. No.: 09/287,841

[22] Filed: Apr. 7, 1999

[30] Foreign Application Priority Data

Apr. 10, 1998 [JP] Japan .................................. 10-098939

[51] Int. Cl.⁷ .............................. G02C 7/04; G02C 7/02; A61F 2/16
[52] U.S. Cl. .......................... 351/161; 351/176; 351/177; 623/6.28
[58] Field of Search ................................. 351/161, 160 R, 351/160 H, 162, 176, 177; 623/6.11, 6.27–628, 6.24

[56] References Cited

U.S. PATENT DOCUMENTS

| | | | |
|---|---|---|---|
| 4,580,882 | 4/1986 | Nuchman et al. | 351/161 |
| 4,636,049 | 1/1987 | Blaker | 351/161 |
| 4,752,123 | 6/1988 | Blaker | 351/161 |
| 5,100,226 | 3/1992 | Freeman | 351/160 R |
| 5,422,687 | 6/1995 | Tanaka et al. | 351/161 |
| 5,497,683 | 3/1996 | Hattori et al. | 82/18 |
| 5,608,471 | 3/1997 | Miller | 351/161 |
| 5,805,260 | 9/1998 | Roffman et al. | 351/161 |
| 5,847,802 | 12/1998 | Menezes et al. | 351/161 |

FOREIGN PATENT DOCUMENTS

| | | |
|---|---|---|
| 0 248 489 | 12/1987 | European Pat. Off. . |
| 0 646 825 A1 | 4/1995 | European Pat. Off. . |
| 57-105717 | 7/1982 | Japan . |
| 61-272717 | 12/1986 | Japan . |

*Primary Examiner*—Georgia Epps
*Assistant Examiner*—Jordan M. Schwartz
*Attorney, Agent, or Firm*—Wall Marjama Bilinski & Burr

[57] ABSTRACT

A toric multifocal lens including a plurality of vision correction regions having centers on a common optical center axis, the plurality of vision correction regions providing respective different values of a spherical optical power, each of the plurality of vision correction regions having an optical power for correction of astigmatism, wherein the improvement comprises: at least one of a cylindrical optical power and a cylindrical axis orientation which determine the optical power for correction of astigmatism being different in at least two different vision correction regions of the plurality of vision correction regions, so that the at least two different vision correction regions have respective different values of the optical power for correction of astigmatism.

7 Claims, 8 Drawing Sheets

TORIC MULTIFOCAL LENS HAVING DIFFERENT ASTIGMATISM CORRECTIVE OPTICAL POWERS IN RESPECTIVE VISION CORRECTION REGIONS, AND METHOD OF PRODUCING THE SAME

The present application is based on Japanese Patent Application No. 10-98939 filed Apr. 10, 1998, the content of which is incorporated hereinto by reference.

BACKGROUND OF THE INVENTION

1. Field of the Invention

The present invention relates to a toric multifocal lens and its related technique, which toric multifocal lens includes a plurality of vision correction regions that provide respective different values of astigmatism corrective optical power, the respective vision correction regions having different values of spherical optical power. In particular, the present invention is concerned with such a toric multifocal lens suitably used as an ophthalmic lens such as a contact lens or an intraocular lens, for correcting a lens wearer's vision which is deteriorated due to decreasing accommodation of the eye, and for correcting astigmatism. The present invention is also concerned with a method of producing the toric multifocal lens, and a cutting apparatus used for cutting a lens blank to form the toric multifocal lens.

2. Discussion of the Related Art

As disclosed in JP-A-57-105717, U.S. Pat. No. 4,636,049, JP-A-61-272717, U.S. Pat. No. 4,752,123, and U.S. Pat. No. 5,422,687, a multifocal lens is known as an ophthalmic lens used for an eye with decreasing accommodation due to presbyopia, or removal of a crystalline lens of the eye. The disclosed multifocal lens includes a plurality of vision correction regions whose centers are aligned with a common optical axis and which provide respective different values of spherical optical power. In addition to improve the decreasing accommodation of the eye, for the purpose of correcting astigmatism which results from distortion of the shape of the cornea or the crystalline lens, there is known a toric multifocal lens as disclosed in U.S. Pat. Nos. 4,580,882, 5,100,226, 5,805,260 and 5,847,802, wherein a plurality of vision correction regions having respective different values of spherical optical power include a toric portion for providing a suitable optical power for correction of astigmatism.

The optical power for correction of astigmatism, i.e., astigmatism corrective optical power, is determined based on a degree of astigmatism and an astigmatic axis of the eye of the patient. It is generally considered that an eye has a constant astigmatic degree and a single astigmatic axis. Accordingly, in the conventional toric multifocal lens, a cylindrical optical power and a cylindrical axis orientation which determine the astigmatism corrective optical power of the lens are made constant throughout the plurality of vision correction regions, corresponding to the astigmatic degree and astigmatic axis of the eye to be corrected. In particular, the cylindrical optical power and the cylindrical axis orientation of the conventional multifocal lens are usually determined on the basis of only the astigmatic degree and the astigmatic axis measured in a distant-viewing condition of the patient's eye.

The above-described conventional toric multifocal lens is, however, unsatisfactory to some patients whose eyes suffer from presbyopia as well as astigmatism, even when the conventional toric multifocal lens has a suitably determined spherical optical power for correction of presbyopia and a cylindrical optical power for correction of astigmatism. In particular, the conventional toric multifocal lens whose cylindrical optical power is determined on the basis of only the astigmatic data obtained in the distant-viewing condition does not assure a sufficiently high degree of visual acuity of the near objects, and the lens wearer undesirably feels an eye fatigue. Thus, the conventional toric multifocal lens is not capable of assuring sufficiently effective presbyopia and astigmatism correction performance with high stability.

As a result of a recent study in the field of the ophthalmic optics, it is found that the astigmatic condition in the eye (i.e., the astigmatic degree and the astigmatic axis) varies with various factors of the eye such as a change of the shape of the crystalline lens, which change change takes place due to a change in a distance from the wearer's eye to the desired object, namely, when the wearer's vision is shifted from the near objects to the distant objects, or vise versa, and due to a change of the diameter of the pupil, for instance. The inventors of the present invention made an extensive study based on the above findings, and found it effective to take into account the above-indicated changes in the astigmatic degree and axis, in determining the optical performance of the toric multifocal lens to be obtained for improving the accommodation of the eye decreased due to presbyopia, and for correcting astigmatism.

SUMMARY OF THE INVENTION

It is therefore a first object of the present invention to provide a toric multifocal lens having an improved structure, which toric multifocal lens assures the wearer of improved visual acuity and a good wearing comfort without causing an eye fatigue as felt by the wearer.

It is a second object of the present invention to provide a method of producing the toric multifocal lens with such a novel structure.

It is a third object of the present invention to provide a cutting apparatus which permits easy production of the toric multifocal lens.

It is a fourth object of the present invention to provide a method of determining a cylindrical optical power and a cylindrical axis orientation for correction of astigmatism in the toric multifocal lens.

The above-indicated first object of the present invention may be attained according to a first aspect of the invention, which provides a toric multifocal lens including a plurality of vision correction regions having centers on a common optical center axis, the plurality of vision correction regions providing respective different values of a spherical optical power, each of the plurality of vision correction regions having an optical power for correction of astigmatism, wherein the improvement comprises: at least one of a cylindrical optical power and a cylindrical axis orientation which determine the optical power for correction of astigmatism being different in at least two different vision correction regions of the plurality of vision correction regions, so that the at least two different vision correction regions have respective different values of the optical power for correction of astigmatism.

The toric multifocal lens constructed according to the above first aspect of the invention includes a plurality of vision correction regions having respective different values of the spherical optical power, so that the present toric multifocal lens is capable of effectively correcting a lens wearer's vision deteriorated by the decreasing accommodation of the eye which results from the presbyopia or the removal of the crystalline lens of the eye. Thus, the present lens assures clear viewing of the objects at a plurality of desired distances, in other words, assures clear viewing of the objects over a relatively wide range of their distance from the eye. In addition, the present toric multifocal lens corrects astigmatism owing to the astigmatic corrective optical power given thereto.

In the present toric multifocal lens, the cylindrical optical power and the cylindrical axis orientation for correction of astigmatism are made different in the different vision correction regions. That is, the cylindrical optical power and the cylindrical axis orientation are determined depending upon the different astigmatic conditions in the eye corresponding to the different vision correction regions. Accordingly, the present toric multifocal lens can advantageously correct astigmatism of the patient's eye with high stability, irrespective of changes in the distance from the wearer's eye to the objects to be observed through the plurality of the vision correction regions. Accordingly, as compared with the conventional toric multifocal lens having a single astigmatism corrective optical power, the present toric multifocal lens effectively assures a high degree of acuity of viewing through the plurality of vision correction regions having respectively determined mutually different cylindrical optical powers and cylindrical axis orientations. Further, the present toric multifocal lens is effective to reduce the eye fatigue as felt by the wearer.

The principle of the present invention is applicable to an intraocular lens implanted in the eye, as well as a contact lens placed on the cornea such as a soft contact lens or a hard contact lens. The present toric multifocal lens can be used as an astigmatic correction lens applicable to the eye suffering from simple astigmatism, complex astigmatism, mixed astigmatism or irregular astigmatism. The toric multifocal lens according to the present invention can be used as a translating vision type lens wherein the vision correction regions with the different optical powers are selectively and alternatively used as needed with a shift of the visual axis of the lens wearer. The present toric multifocal lens can also be used as a simultaneous vision type lens wherein the vision correction regions with the different optical powers are simultaneously used irrespective of the shift of the visual axis of the eye. The optical center axis of the present toric multifocal lens with which the centers of the plurality of vision correction regions are aligned may be coaxial with a geometrical center axis of the lens. Alternatively, the optical center axis of the lens may be offset from the geometrical center axis of the lens, by taking account of the position of the center of the pupil of the eye, the wearing condition of the lens, and also the shift of the visual axis in the translating vision type lens.

In the present toric multifocal lens having the two or more vision correction regions for achieving the intended vision correction performance depending on the condition of the eye on which the lens is worn, the values of the spherical optical power provided by the respective vision correction regions need not be constant. For instance, the toric multifocal lens may be arranged to have an intermediate vision correction region which is provided between a near vision correction region having a near-vision spherical optical power and a distant vision correction region having a distant-vision spherical optical power. In this case, the intermediate vision correction region may have a spherical optical power which continuously varies from the spherical optical power of one of the near and distant vision correction regions to that of the other vision correction region.

The cylindrical optical power and the cylindrical axis orientation which determine the astigmatic corrective power of the present toric multifocal lens are indices conventionally used in the field of the ophthalmic lens to treat the astigmatism. The optical characteristics of the astigmatic correction lens are usually determined by a combination of the cylindrical optical power, the cylindrical axis orientation and the spherical optical power. When the toric multifocal lens has three or more vision correction regions having respective different values of the spherical optical power, at least two regions of the three or more vision correction regions have respective different values of the cylindrical optical power and the cylindrical axis orientation, depending upon the condition of the eye on which the toric multifocal lens is worn. Described more specifically, in the above-described present toric multifocal lens having the three vision correction regions (near, intermediate and distant vision correction regions), for instance, at least one or both of the cylindrical optical power and the cylindrical axis orientation in the near vision correction region is/are made different from the corresponding one or ones of the cylindrical optical power and/or the cylindrical axis orientation in the distant vision correction region.

In a first preferred form of the above first aspect of the present invention, the toric multifocal lens includes positional stabilization means for maintaining the predetermined circumferential orientation of the lens on the cornea of a wearer's eye. According to this arrangement, the lens can be suitably and easily placed in position on the eye such that the cylindrical axis of the lens is aligned with the astigmatic axis of the wearer's eye, so that the present toric multifocal lens achieves excellent astigmatic correction. As the positional stabilization means, any known suitable structures may be employed. For instance, the lens may have a prism ballast structure wherein the gravity center of the lens is located at a relatively lower portion thereof. Alternatively, the lens may have a dynamic stabilization structure wherein the upper and lower portions of the front surface of the lens are partly removed to reduce the thickness at those portions, so that the lens has inclined surfaces (generally called slab-off areas) at the upper and lower portions. Further, the lens may have a truncated structure wherein the lower bottom portion of the lens is removed to provide a flat face perpendicular to the axis of the lens, more precisely, in the horizontal direction when the lens is placed on the eye.

In the toric multifocal lens according to the present invention, one of its opposite surfaces may be a part-spherical surface consisting of a plurality of concentric annular portions which have respective different curvatures giving the respective different spherical optical powers, while the other surface may be a toric surface giving different astigmatism corrective optical powers. In a second preferred form of the above first aspect of the present invention, however, an optical portion of one of opposite surfaces of the lens has a part-spherical concave profile following that of the cornea, while an optical portion of the other surface has an aspherical convex profile which gives the respective different values of the spherical optical power in the plurality of vision correction regions and the respective different values of the astigmatism corrective optical power in the at least two different vision correction regions. This arrangement improves the wearing condition of the lens on the cornea surface, so that the lens has an excellent astigmatic correction capability. Further, this arrangement is effective to prevent the lens, in particular the hard contact lens, from being adversely influenced by the tear liquid existing between the back surface of the lens and the cornea surface, whereby the lens exhibits an intended correction effect with high stability. In addition, in the toric multifocal lens constructed according to the above second form of the first aspect of the invention, the optical portion of the above-indicated one surface of the lens has the part-spherical concave profile following that of the cornea, to thereby permit easy formation of that surface by a cutting operation, resulting in improved production efficiency of the lens.

In a third preferred form of the above first aspect of the present invention, the toric multifocal lens includes toric portions provided on opposite surfaces thereof and cooperating with each other to provide the respective different values of the optical power for correction of astigmatism in the at least two different vision correction regions of the plurality of vision correction regions. In this arrangement, for instance, one of the opposite surfaces of the lens has a toric portion having a constant cylindrical optical power and a single cylindrical axis orientation throughout the plurality of vision correction regions, while the other surface has a toric portion with a constant cylindrical optical power and a single cylindrical axis orientation in a selected vision correction region or regions, which cylindrical optical power and cylindrical axis orientation are different from those of the toric portion of the above-indicated one surface of the lens. The thus formed opposite surfaces of the toric multifocal lens cooperate with each other to provide the astigmatism corrective optical powers which are different in the at least two different vision correction regions. This eliminates local changes of the cylindrical optical power and the cylindrical axis orientation in the above-indicated one surface of the lens having the constant cylindrical optical power and the single cylindrical axis orientation which are constant throughout the plurality of the vision correction regions, to thereby facilitate the production of the lens by a cutting operation.

Alternatively, the opposite surfaces of the lens may have toric portions in different vision correction regions. In this case, at least one of the cylindrical optical power and the cylindrical axis orientation of one toric portion is made different from the corresponding at least one of the cylindrical optical power and the cylindrical axis orientation of the other toric portion, to thereby provide respective different astigmatism corrective optical powers in the at least two vision correction regions. According to this arrangement, it is not necessary to change the cylindrical optical power and the cylindrical axis orientation in the vision correction regions on both surfaces of the lens, resulting in easy production of the lens. Further, if the toric portion formed on one surface of the lens is combined with another toric portion formed on the other surface as described above, the lens can provide a relatively large cylindrical optical power with a simple structure. manner.

The above-indicated second object of the present invention may be attained according to a second aspect of the invention, which provides a method of producing the toric multifocal lens as defined in the above first aspect of the invention, by moving a cutting tool to effect a cutting operation on a surface of a lens blank while the lens blank is rotated about an axis (L) of rotation thereof, such that the cutting tool is moved about an arc center axis (Q, Q') which is perpendicular to the axis of rotation of the lens blank, so that the cutting tool is moved in a plane (X-Y) perpendicular to the arc center axis, along a circular arc having a center on the arc center axis (Q, Q'), the method comprising: moving the lens blank such that an optical center axis (O, O') of the lens blank being reciprocatingly moved in an offset direction relative to the axis (L) of rotation of the lens blank by a predetermined offset distance (e) at angular interval of 90° about the axis of rotation while the lens blank is rotated about the axis of rotation; moving the cutting tool along at least two circular arcs (60, 61) in the plane; and determining at least one of the offset distance and the offset direction of the lens blank, and a radius (r, r') of each of the at least two circular arcs, depending upon an angle (θ, θ') of rotation of the cutting tool in the plane (X-Y) about the arc center axis (Q, Q').

In effecting the cutting operation on a surface of the lens blank according to the present method, the lens blank is reciprocatingly moved as described above relative to the rotation axis thereof, so that the obtained lens has the cylindrical optical power corresponding to the offset distance of the lens blank relative to its axis of rotation. Further, the cylindrical axis orientation of the lens is determined depending upon the offset direction of the lens blank. In addition, the spherical optical power values of the lens are suitably determined depending upon the radii of the circular arcs along which the cutting tool is moved. In this arrangement, by determining the radius of each circular arc path taken by the cutting tool depending upon the angle of rotation of the cutting tool about the arc center axis in the plane perpendicular to the axis of rotation of the lens blank, the plurality of vision correction regions having respective different values of the spherical optical power are coaxially formed on the machined lens surface, and the plurality of vision correction regions have respective different cylindrical optical powers and cylindrical axis orientations, by changing the offset distance and/or the offset direction of the lens blank with respect to its rotation axis thereof.

The present method permits the formation of the desired lens surface by a single cutting operation on the lens blank, which lens surface provides the respective different spherical optical power values in the plurality of concentric vision correction regions, and the respective different astigmatic corrective optical power values in the at least two different vision correction regions. Thus, the intended toric multifocal lens as described above can be easily produced according to the present method.

The above-indicated third object of the present invention may be attained according to a third aspect of the invention, which provides a cutting apparatus for producing a toric multifocal lens as defined in the above first aspect of the invention, the apparatus comprising: a lens blank holder for rotatably holding a lens blank about an axis (L) of rotation thereof, such that an optical center axis (O, O') of the lens blank is reciprocatingly movable in an offset direction relative to the axis of rotation of the lens blank by a predetermined offset distance (e) at angular interval of 90° about the axis of rotation while the lens blank is rotated about said axis of rotation; a cutting tool feeding device for holding a cutting tool for effecting a cutting operation on a surface of the lens blank while the lens blank is rotated by the lens blank holder about the axis of rotation thereof, the cutting tool feeding device holding the cutting tool such that the cutting tool is movable about at least two arc center axes (Q, Q') perpendicular to the axis of rotation of the lens blank, in a plane (X-Y) perpendicular to the arc center axes, along respective at least two circular arcs having centers on the at least two arc center axes, respectively; and a control device for controlling at least one of the offset distance and the offset direction of the lens blank, and a radius (r, r') of each of the at least two circular arcs, depending upon an angle of rotation of the cutting tool in the plane (X-Y) about the arc center axes.

In the cutting apparatus constructed according to the above third aspect of the present invention wherein the cutting tool for effecting the cutting operation on the lens blank is moved by the cutting tool feeding device while the lens blank held by the lens blank holder is rotated about the axis of rotation thereof, one of the opposite surfaces of the lens blank is subjected to a cutting operation to provide the intended lens surface. In this cutting operation, the radius of each of the at least two circular arcs along which the cutting tool is moved is controlled by the control device depending upon the angle of rotation of the cutting tool about the corresponding arc center axis in the plane perpendicular to the rotation axis of the lens blank. Accordingly, the plurality of vision correction regions having respective different spherical optical powers are coaxially formed on the machined surface of the lens blank, to thereby provide the intended lens surface, and the thus formed plurality of vision correction regions can have respective different cylindrical optical powers and respective different cylindrical axis orientations, by changing the offset distance and/or the offset direction of the lens blank with respect to the rotation axis by means of the control device.

The present cutting apparatus constructed as described above is advantageously used in the above-described method of producing the toric multifocal lens. Further, the present cutting apparatus permits the formation of the intended lens surface by a single cutting operation, which lens surface has the respective different spherical optical powers in the plurality of concentric vision correction regions, and the respective different astigmatism corrective optical powers in at least two different vision correction regions of the plurality of vision correction regions. Accordingly, the cutting apparatus constructed according to the present invention assures easy manufacture of the above-described toric multifocal lens of the present invention.

The above-indicated fourth object of the present invention may be attained according to a fourth aspect of the invention, which provides a method of determining an optical power for correction of astigmatism in a toric multifocal lens as defined in the above first aspect of the present invention including a near vision correction region and a distant vision correction region, the optical power for correction of astigmatism being determined by a combination of a cylindrical optical power and a cylindrical axis orientation, the method comprising: determining the cylindrical optical power and the cylindrical axis orientation in the near vision correction region based on astigmatic data on an eye of a wearer of the toric multifocal lens measured during viewing of near objects, and determining the cylindrical optical power and the cylindrical axis orientation in the distant vision correction region based on astigmatic data on the eye measured during viewing of distant objects.

According to the present method described above, the cylindrical optical powers and the cylindrical axis orientation of the lens are determined based on the astigmatic conditions of the eye measured during viewing of the near objects and during viewing of the distant objects, respectively. In the present method, the astigmatic corrective optical power is suitably determined for each of the near and distant vision correction regions, by taking account of different astigmatic conditions of the eye which result from various factors of the eye such as a change of the shape of the crystalline lens, which change takes place due to a change in a distance from the wearer's eye to the desired object when the wearer's line of vision is shifted from the near objects to the distant objects, or vise versa, and a change of the diameter of the pupil. According to the present method, the toric multifocal lens advantageously exhibits an intended astigmatic correction effect so as to meet various astigmatic conditions of the individual lens wearers, to thereby correct astigmatism with high stability. Thus, the toric multifocal lens whose astigmatic corrective powers are suitably determined according to the present invention assures a considerably improved viewing acuity through both of the near and distant vision correction regions, and a effectively reduced eye fatigue as felt by the lens wearers, as compared with the conventional toric multifocal lens which has a single astigmatic corrective optical power determined based on only the astigmatic condition of the eye measured during viewing of the distant objects.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF PRESENTLY PREFERRED EMBODIMENTS

Figure 1:
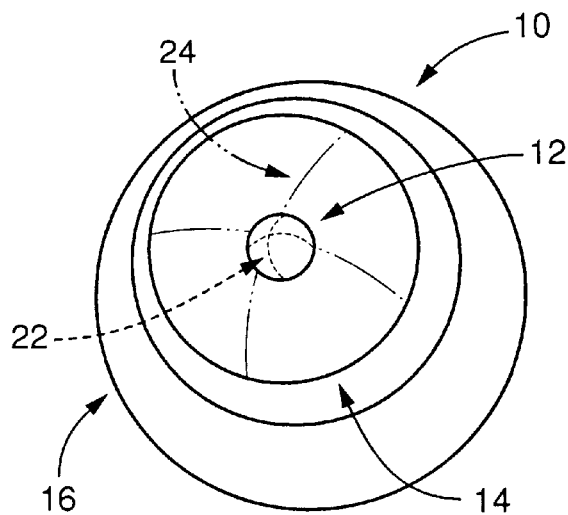
FIG. 1 is a perspective view of a toric multifocal lens in the form of a presbyopia correction contact lens constructed according to a first embodiment of the present invention.
Figure 2:
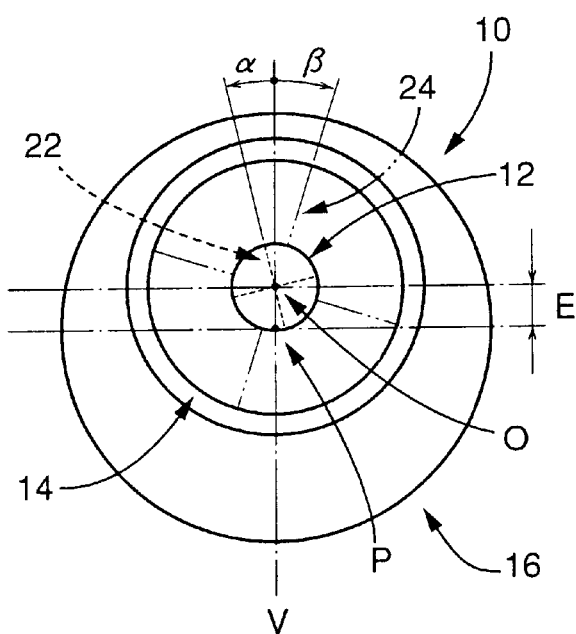
FIG. 2 is a plan view of the presbyopia correction contact lens of FIG. 1.
Figure 3:
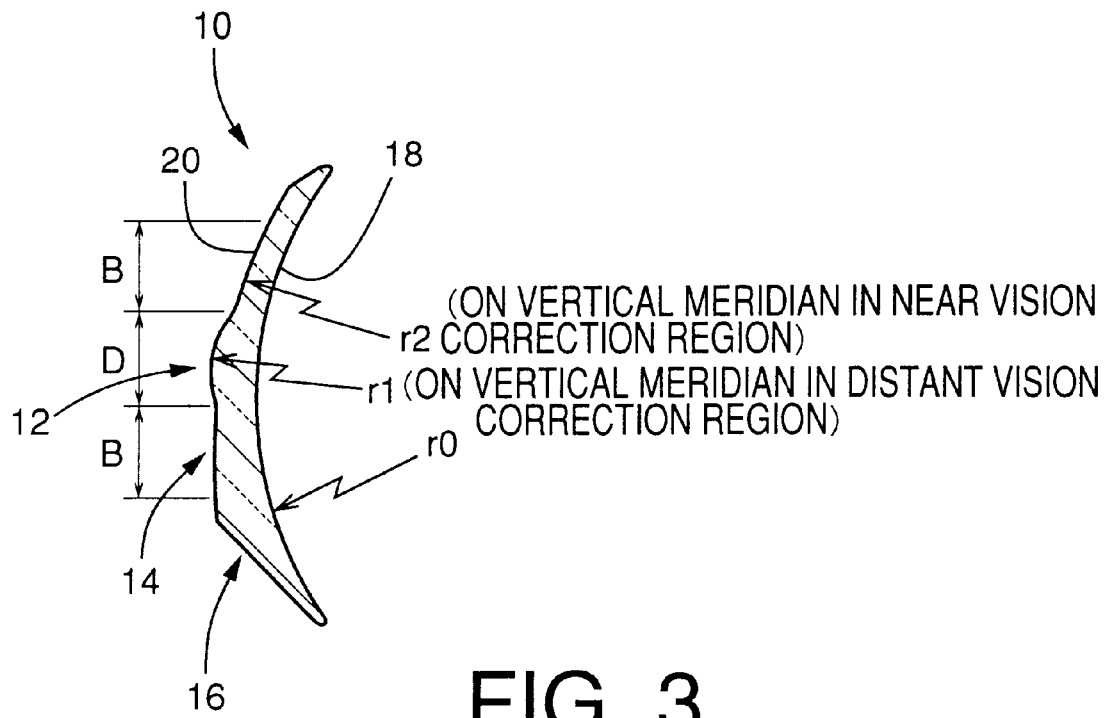
FIG. 3 is an elevational view in cross section of the presbyopia correction contact lens of FIG. 1.

Referring first to FIG. 1, there is shown a toric multifocal lens in the form of a presbyopia correction contact lens 10 constructed according to a first embodiment of the present invention. FIG. 1 is a perspective front view of the contact lens 10 showing its front surface, while FIGS. 2 and 3 are a plan view and a cross sectional view of the contact lens 10, respectively. The presbyopia correction contact lens 10 of the present embodiment includes, at a substantially central portion thereof, a circular near vision correction region 12 having a diameter D (FIG. 3), and an annular distant vision correction region 14 surrounding the near vision correction region 12 and having a width B (FIG. 3). The near and distant vision correction regions 12, 14 cooperate with each other to constitute an optical zone which exhibits an intended vision correct ion performance. An annular portion 16 located radially outwards of the distant vision correction region 14, in other words, the radially outermost portion 16 of the contact lens 10 is a non-optical zone which does not have any optical vision correction effect.

The contact lens 10 of this embodiment is a simultaneous vision type lens, wherein the optical portions of both of the near and distant vision correction regions 12, 14 are simultaneously used in observing the desired object, and a clearer image obtained through one of the two vision correction regions 12, 14 is selected by an action of the lens wearer's brain.

As shown in FIG. 2, the near and distant vision correction regions 12, 14 have a common optical center axis o which is offset from a geometrical center axis P of the lens 10, which is a center of a circle defined by the periphery of the lens 10 (periphery of the outermost portion 16). The optical center axis O is offset from the geometrical center axis P in an upward direction as seen in FIG. 2 by a predetermined distance E. This offset distance E is suitably determined as needed by taking account of the position of the center of the pupil of the wearer's eye. The optical center axis O may be offset from the geometrical center axis P also in a horizontal or lateral direction of the lens 10, for example, toward the nose of the wearer when the lens 10 is worn on the eye.

The presbyopia correction contact lens 10 has a concave back surface 18 corresponding to a front surface of the cornea of the wearer's eye. The back surface 18 has a part-spherical profile having a radius of curvature r0 (base curve) which approximates the curvature of the cornea of the eye on which the lens 10 is worn. In the outer peripheral portion of the back surface 18 of the lens 10, there is provided, as needed, a beveled portion with a larger radius of curvature.

The presbyopia correction contact lens 10 has a front surface 20 consisting of a convex surface in the near vision correction region 12, which surface provides a refractive power that gives an effective near vision correction power, and a convex surface in the distant vision correction region 14, which surface provides a refractive power that gives an effective distant vision correction power. The center of the front surface 20 is offset from that of the back surface 18 in a downward direction of the lens 10, which direction is opposite to the offset direction of the optical center axis O from the geometrical center axis P of the lens 10, so that the contact lens 10 has a prism ballast structure wherein the gravity center of the lens 10 is located at a relatively lower portion thereof. Further, the outer peripheral portion of the front surface 20 has a reduced thickness and functions as a slab-off area.

In the present presbyopia correction contact lens 10, the near vision correction region 12 and the distant vision correction region 14 have respective different spherical optical powers, and respective different astigmatic corrective optical powers, namely, respective different cylindrical optical powers and cylindrical axis orientations. In the present embodiment, the spherical optical powers and the astigmatic corrective optical powers of the near and distant vision correction regions 12, 14 are established by forming the front surface 20 of the lens 10 into a predetermined configuration.

Described in detail, in determining the configuration of the front surface 20, the refractive index of the patient's or lens wearer's eye is initially measured. As the refractive index, there are measured at least degrees of the spherical ametropia (myopia and hyperopia) and the astigmatism. In particular, the astigmatic degree and the astigmatic axis of the patient's eye are measured in each of the near-viewing condition and the distant-viewing condition. The configuration of the convex surface in the near vision correction region 12, which surface partially constitutes the front surface 20 of the lens 10, is arranged by determining 1) the cylindrical axis orientation of the convex surface in the near vision correction region 12, namely, an inclination angle α (FIG. 2.) of a vertical meridian 22 of the convex surface with respect to a vertical line V of the lens 10 passing the geometrical center P of the lens 10, and 2) the cylindrical optical power and the radius of curvature r1 on one of two mutually perpendicular principal meridians of the convex surface in the near vision correction region 12 (e.g., on the vertical meridian 22 in this embodiment), while taking account of the measured spherical myopia and the astigmatic degree and axis measured in the near-viewing condition. The thus formed convex surface in the near vision correction region 12 provides not only the spherical optical power effective to correct the patient's near-sightedness, but also the cylindrical optical power effective to correct the astigmatism in the near-viewing condition.

The configuration of the convex surface in the distant vision correction region 14, which convex surface cooperates with the above-described convex surface in the near vision correction region 12 to constitute a substantive portion of the front surface 20 of the lens 10, is arranged by determining 1) the cylindrical axis orientation of the convex surface, namely, an inclination angle β of a vertical meridian 24 of the convex surface in the distant vision correction region 14 with respect to the vertical line V of the lens 10, and 2) the cylindrical optical power and the radius of curvature r2 on one of two principal meridians of the convex surface in the distant vision correction region 14 (e.g., on the vertical meridian 24 in this embodiment), while taking account of the measured spherical hyperopia and the astigmatic degree and axis measured in the distant-viewing condition. The thus formed convex surface in the distant vision correction region 14 provides not only the spherical optical power effective to correct the patient's farsightedness, but also the cylindrical optical power effective to correct the astigmatism in the distant-viewing condition.

In the presbyopia correction contact lens 10 constructed as described above, at least one of the cylindrical axis orientation and the cylindrical optical power of the near vision correction region 12 is different from the corresponding at least one of the cylindrical optical power and the cylindrical axis orientation of the distant vision correction region 14, depending upon the different astigmatic conditions of the eye in the near-viewing condition and the distant-viewing condition. According to this arrangement, the astigmatic condition of the eye which is experienced specifically in the near-viewing condition is effectively corrected owing to the astigmatic corrective optical power provided by the near vision correction region 12 which is formed as described above and which provides also the effective near vision corrective power. On the other hand, the astigmatic condition of the eye which is experienced specifically in the distant-viewing condition is effectively corrected owing to the astigmatic corrective optical power provided by the distant vision correction region 14 which is formed as described above and which provides also the effective distant vision correction power.

Figure 4:
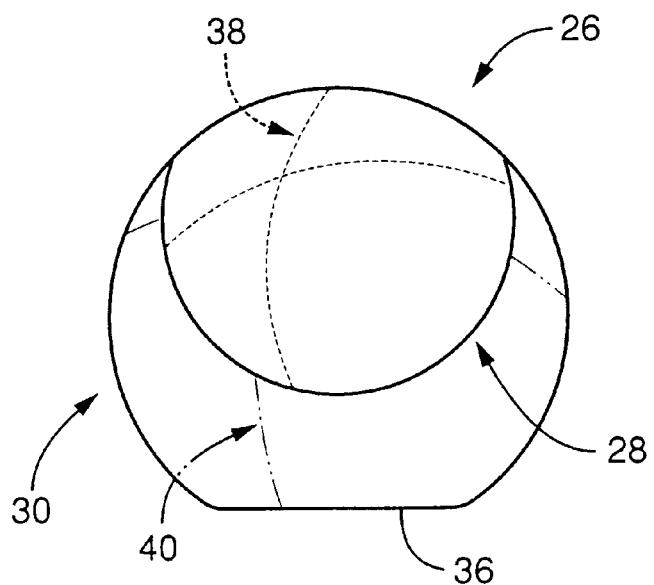
FIG. 4 is a perspective view of a toric multifocal lens in the form of a presbyopia correction contact lens constructed according to a second embodiment of the present invention.
Figure 5:
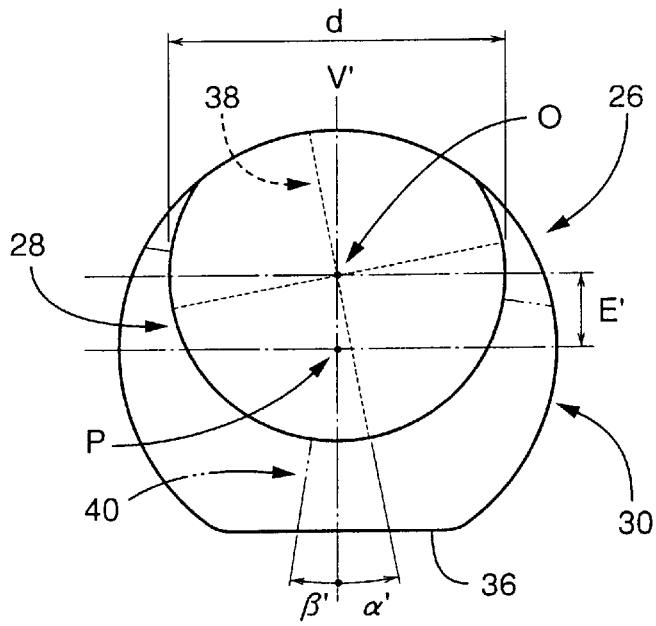
FIG. 5 is a plan view of the presbyopia correction contact lens of FIG. 4.
Figure 6:
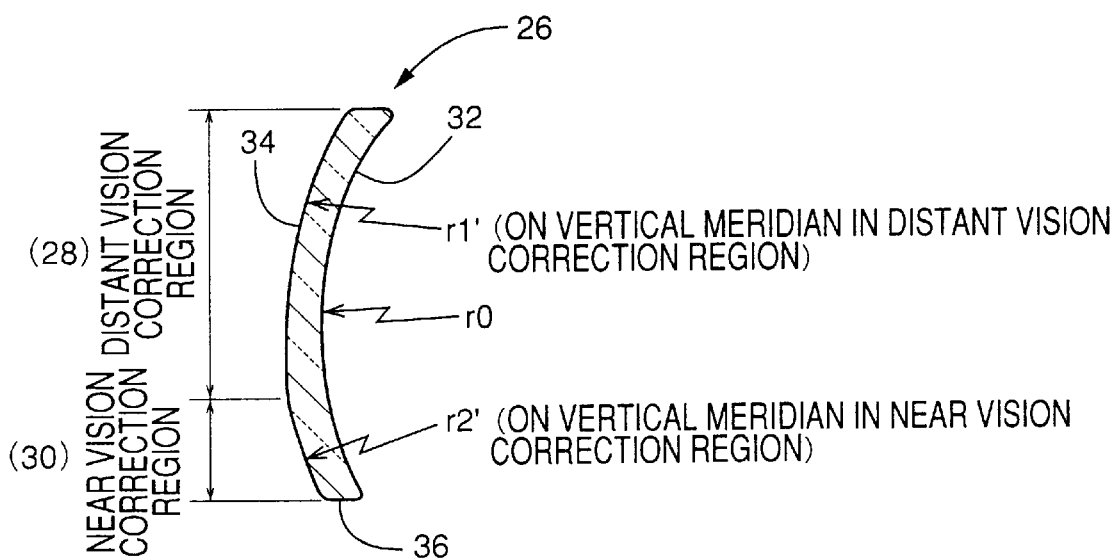
FIG. 6 is an elevational view in cross section of the presbyopia contact lens of FIG. 5.

Referring next to FIG. 4, there is shown a toric multifocal lens in the form of a translating vision type, presbyopia correction contact lens 26 constructed according to a second embodiment of the present invention. FIG. 4 is a perspective front view of the contact lens 26 showing its front surface, while FIGS. 5 and 6 are a plan view and a cross sectional view of the contact lens 26, respectively. The presbyopia correction contact lens 26 of the present embodiment consists of a substantially circular distant vision correction region 28 having a diameter d (FIG. 5) and formed at a central portion of the lens 26, and a near vision correction region 30 surrounding the distant vision correction region 28. The near and distant vision correction regions 28, 30 cooperate with each other to constitute an optical zone which exhibits an intended vision correction performance. As shown in FIG. 5, the distant and near vision correction regions 28, 30 have a common optical center axis O which is offset from a geometrical center axis P of the lens 26, which is a center of a circle defined by the periphery of the lens 26. The optical center axis O is offset from the geometrical center axis P in an upward direction as seen in FIG. 5 by a predetermined distance E'. This offset distance E' is suitably determined as needed by taking account of the position of the center of the pupil of the lens wearer's eye. The optical center axis O may be offset from the geometrical center axis P also in a horizontal or lateral direction of the lens 26, for example, toward the nose of the wearer when the lens 26 is worn on the eye.

In the thus formed translating vision type presbyopia correction contact lens 26, the optical portions of the distant vision correction region 28 and the near vision correction region 30 are selectively and alternatively used in observing the desired object, depending upon the relative positional relationship between the vision correction regions 28, 30 of the lens 26 and the center of the pupil of the lens wearer's eye, in accordance with a shift of the visual axis of the lens wearer. In other words, the distant and near vision correction regions 28, 30 are selectively used depending upon the shift of the visual axis (line of view) of the lens wearer, so that the objects at the distant and near distances can be clearly observed through the distant and near vision correction regions 28, 30, respectively. The presbyopia correction contact lens 26 of this embodiment has a truncated structure, wherein the lower bottom portion of the lens 26 is removed in a direction perpendicular to the axis of the lens 26, to thereby provide a truncated flat bottom portion 36 which functions as rotation preventive means for preventing the lens 26 from rotating in its circumferential direction on the cornea of the eye while the lens is placed thereon.

As shown in FIG. 6, the presbyopia correction contact lens 26 of this second embodiment has a back surface 32 having a suitable radius of curvature r0 (base curve), like the presbyopia correction contact lens 10 in the preceding first embodiment. The contact lens 26 has a front surface 34 with a convex profile which provide two different refractive powers that give effective near vision and distant vision corrective powers, respectively.

In the presbyopia correction contact lens 26 of this second embodiment, too, not only the spherical optical power but also the cylindrical optical power and the cylindrical axis orientation are made different in the distant and near vision correction regions 28, 30, by forming the front surface 34 into a predetermined configuration, whereby the lens 26 exhibits vision correction effects in both of the distant-viewing and near-viewing conditions. More specifically described, for both of the distant and near vision correction regions 28, 30, there are determined 1) the cylindrical axis orientations of the front surface 34, namely, an inclination angle $\alpha'$ of a vertical meridian 38 of the front surface 34 in the distant vision correction region 28 with respect to a vertical line V' of the lens 26 passing the geometric center P of the lens 26, and an inclination angle $\beta'$ of a vertical meridian 40 of the front surface 34 in the near vision correction region 30 with respect to the vertical line V', and 2) the cylindrical optical powers and the radii of curvature r1', r2' on one of two mutually perpendicular principal meridians of the front surface 34 in the distant and near vision correction regions, respectively (e.g., on the vertical meridian 38 in the distant vision correction region 28 and on the vertical meridian 40 in the near vision correction region 30 in this embodiment). The determination of the spherical optical power and the astigmatism corrective optical power in each of the distant and near vision correction regions 28, 30 is effected in a manner similar to that in the above first embodiment, by taking account of the spherical ametropia values and the astigmatic degrees and axes measured in the near-viewing conditions and distant-viewing conditions, respectively.

In the presbyopia correction contact lens 26 constructed as described above, at least one of the cylindrical axis orientation and the cylindrical optical power of the distant vision correction region 28 is made different from the corresponding at least one of the cylindrical optical power and the cylindrical axis orientation of the near vision correction region 30, depending upon the different astigmatic conditions of the eye in the distant-viewing condition and the near-viewing condition. The thus formed presbyopia correction contact lens 26 exhibits effective astigmatic correction capability that deals with various astigmatic conditions of the individual lens wearers, to thereby assure improved vision correction effects with high stability as in the contact lens 10 of the above first embodiment.

The presbyopia correction contact lenses 10, 26 of the first and second embodiments may be produced by molding, using a suitable mold assembly. Alternatively, the lenses 10, 26 may be produced by a cutting operation using a cutting apparatus as shown in FIGS. 7 and 8.

Figure 7:
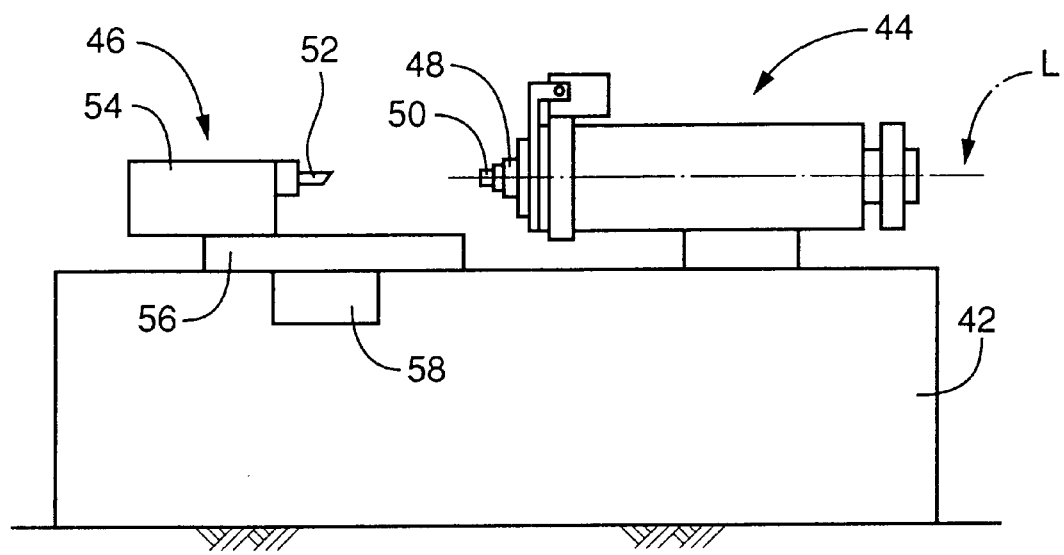
FIG. 7 is a front elevational view schematically showing a cutting apparatus according to the present invention used for forming the toric multifocal lens of the present invention.
Figure 8:
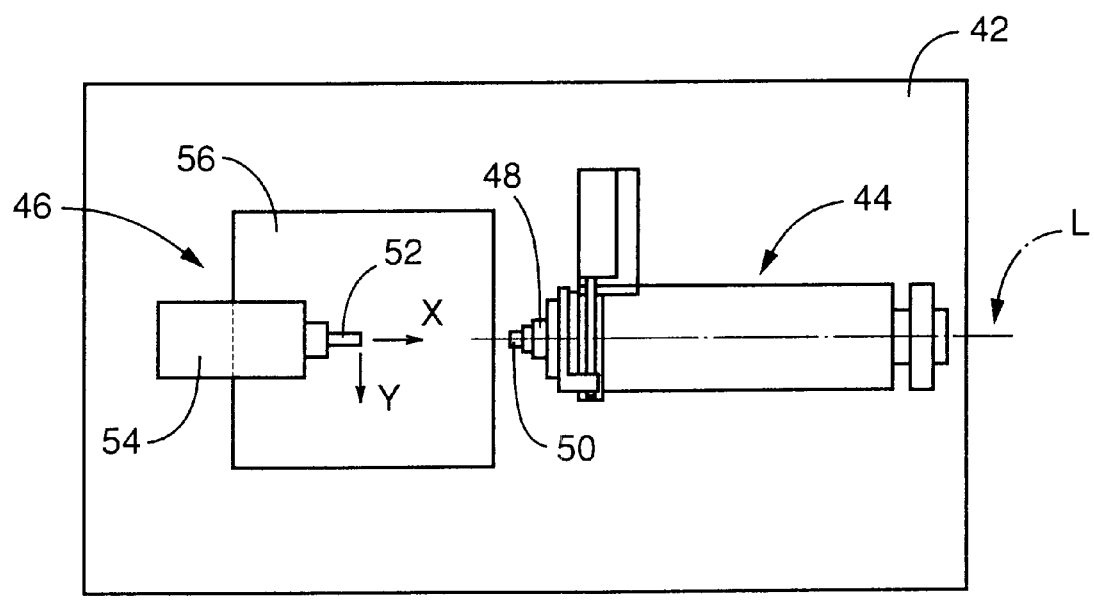
FIG. 8 is a top plan view of the cutting apparatus of FIG. 7.

The cutting apparatus shown in FIGS. 7 and 8 includes a lens blank holder in the form of a headstock 44 and a tool feeding device 46, which are opposed to each other on a bed 42. The headstock 44 has a main spindle 48 to which a lens blank 50 is fixed by a chuck. The main spindle 48 is driven by an electric motor, for instance, to rotate the lens blank 50 about an axis L of rotation. The tool feeding device 46 includes a tool post 54 on which a cutting tool 52 having a hard tip at its end is fixed, and a support base 56 on which the tool post 54 is movably supported such that the cutting tool 52 is opposed to the lens blank 50 held on the headstock 44. The cutting apparatus further includes a numerical control device 58 for controlling the electric motor for driving the main spindle 48, and the movements of the tool post 54, namely, movements of the cutting tool 52, in a horizontal plane (FIG. 8) along mutually perpendicular X and Y axes.

Figure 9:
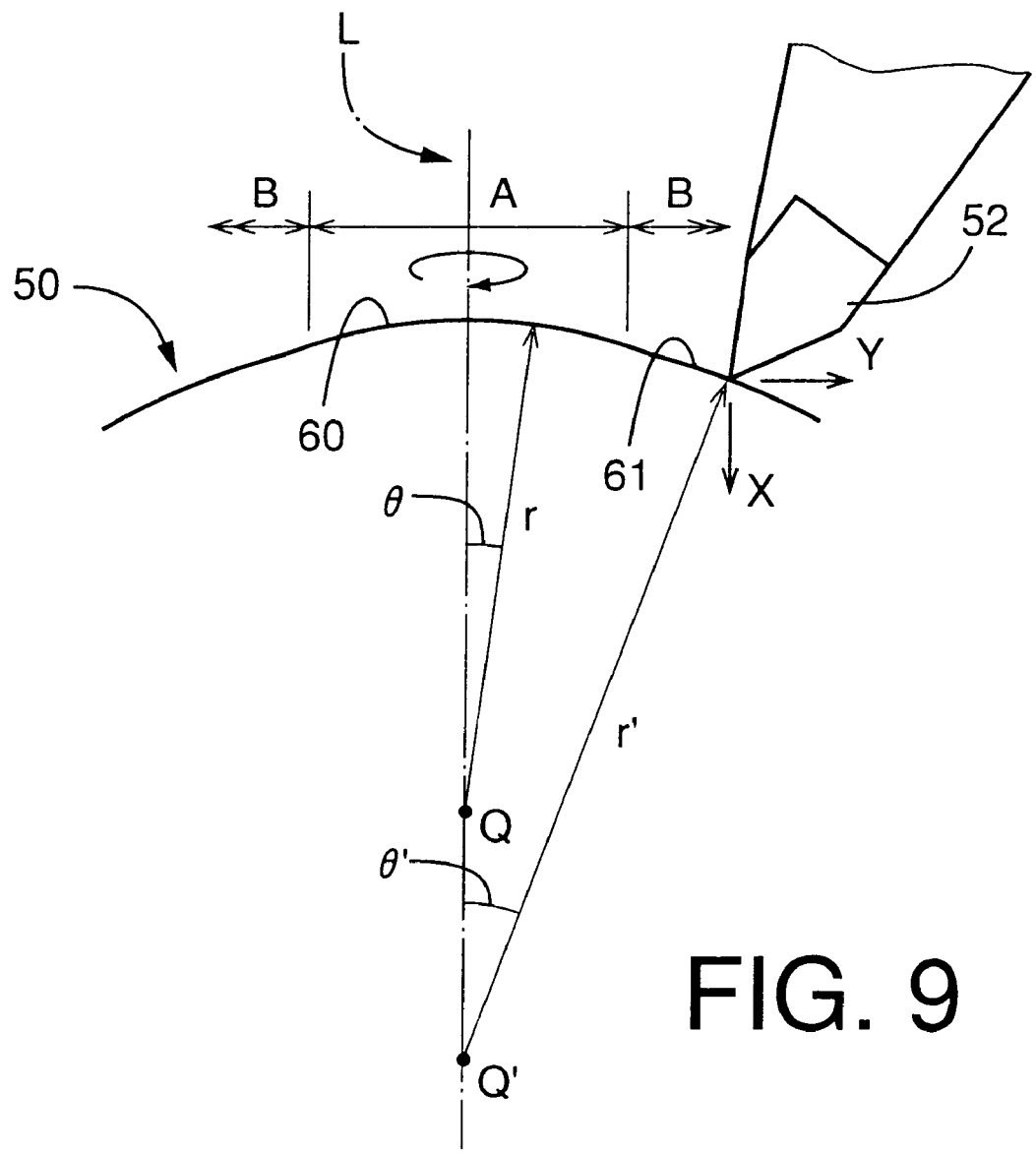
FIG. 9 is a view explaining a cutting operation effected by the cutting apparatus of FIG. 7 for forming a part-spherical toric lens surface.

As schematically shown in FIG. 9, the cutting tool 52 held by the tool feeding device 46 is brought into contact with a surface of the lens blank 50, which surface is to be formed into a desired front surface of the intended lens, while the lens blank 50 is rotated about its rotation axis L by the main spindle 48. In this state, the control device 58 controls the movements of the tool post 54 along the X and Y axes to feed the cutting tool 52 along a circular arc having a radius of curvature r, in the horizontal plane including the rotation axis L, so that a central part A of the front surface of the lens blank 50 is cut by the cutting tool 52. This circular arc has a center on an arc center axis Q which lies on and is orthogonal to the rotation axis L of the lens blank. As a result, a part-spherical surface 60 with a radius of curvature r is formed in the central part A of the lens blank 50, as indicated in FIG. 9.

When the point of contact of the cutting edge of the tool 52 with the front surface of the lens blank 50 has been moved to the periphery of the central part A (part-spherical surface 60), the movements of the tool 52 along the X and Y axes are controlled so that an annular part B of the front surface of the lens blank 50 is cut by the toll 52 along a circular arc having a radius of curvature r' which is larger than the radius of curvature r. This circular arc has a center on an arc center axis Q' which lies on the rotation axis L and which is distant from the arc center axis Q. The radius of curvature r' is determined depending upon the Y-axis dimension of the central part A or an angle θ between the rotation axis L and a straight line which passes the axis Q and the point of contact of the cutting edge of the tool 52 with the lens blank 50 when the cutting of the central part A is completed. As a result, an annular part-spherical surface 61 with a radius of curvature r' is formed in the annular part B, as also indicated in FIG. 9. Thus, the surfaces 60 and 61 have different radii of curvature r, r'. Taking the presbyopia correction contact lens 10 of the first embodiment, for example, the surfaces 60 and 61 respectively provide the near vision correction region 12 and the distant vision correction region 14 which are coaxially formed in the respective parts A and B of the front surface of the lens blank 50.

Figure 10:
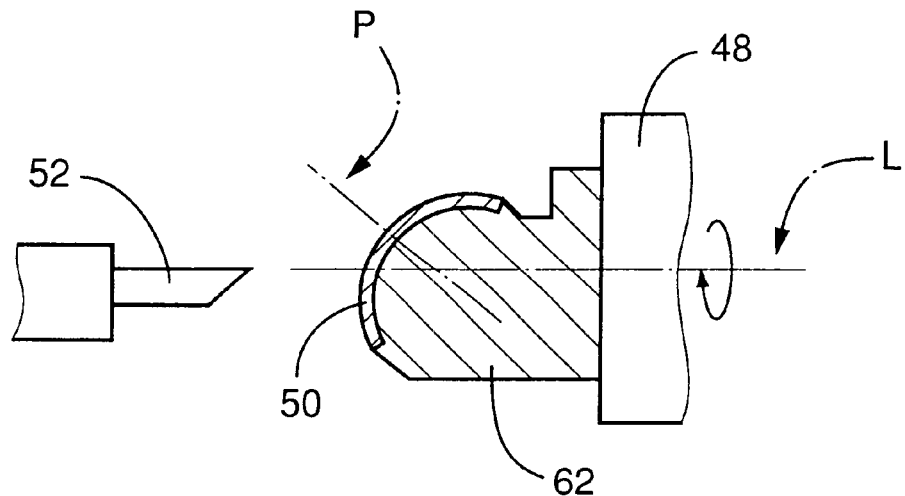
FIG. 10 is an elevational view showing one example of a lens blank holder used in the cutting apparatus of FIG. 7, which holder permits the cutting operation on the lens blank such that the optical center axis of the lens to be obtained is offset from the geometrical center axis of the lens.

In producing the presbyopia correction contact lens 10, 26 according to the present invention, the optical center axis O of the lens can be offset from the geometrical center axis P of the lens by cutting the lens blank 50 using a jig 62 as shown in FIG. 10. Namely, the geometrical center axis P of the lens blank 50 is automatically offset from the rotation axis L of the main spindle 48 by a suitable distance E, E' when the lens blank 50 is attached to the jig 62.

In addition, the headstock 44 employs a lens blank reciprocating mechanism for reciprocating the lens blank 50 in a direction perpendicular to the rotation axis L during rotation of the lens blank 50 about the axis L, such that the optical center axis O of the lens to be obtained is reciprocated in the above-indicated direction by a suitable eccentricity distance e at an angular interval of 90° about the axis L of rotation of the lens blank 50, so that the lens blank 50 has the optical center axis O' (FIG. 12) when the lens blank is moved relative to the rotation axis L in the above-indicated direction by the eccentricity distance e. Such a reciprocating mechanism is disclosed in JP-A-6-226611 (U.S. Pat. No. 5,497,683 owned by the assignee of the present invention), for instance. The mechanism comprises (a) a chuck member for holding the lens blank and having a chuck member axis; (b) a guide member having a circular guide hole provided outside of the chuck member; (c) a chuck support member provided in the circular guide hole of the guide member, the chuck support member being rotatable about a rotation major axis and displaceable on a displacement line orthogonal to the rotation major axis, such that the chuck member axis is displaced on the displacement line during rotation of the chuck support member relative to the guide member, the chuck support member including guiding end portions which move along and are guided by contact with an inner peripheral face of the guide hole during rotation of the chuck support member, and wherein the rotation major axis is eccentric to a center axis of the circular guide hole such that during rotation of the chuck support member the chuck member rotates and the chuck member axis moves along the displacement line; and (d) a control mechanism for controlling a distance of eccentricity between the center axis of the guide hole of the guide member and the rotation major axis by moving the guide member relative to the rotation major axis in a direction orthogonal to the rotation major axis.

Figure 11:
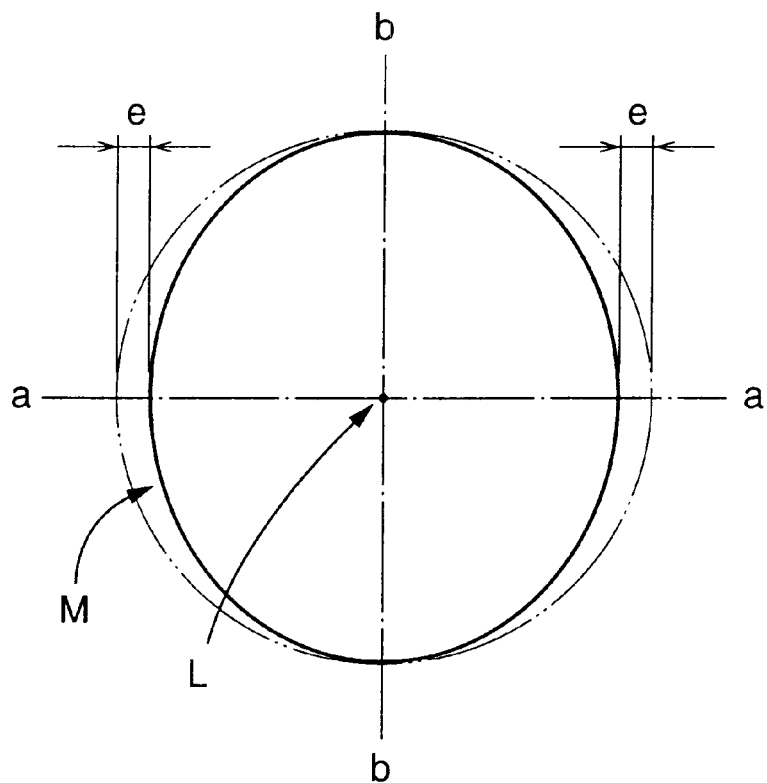
FIG. 11 is a view explaining a cutting operation effected by the cutting apparatus of FIG. 7 for forming a toric lens surface.
Figure 12:
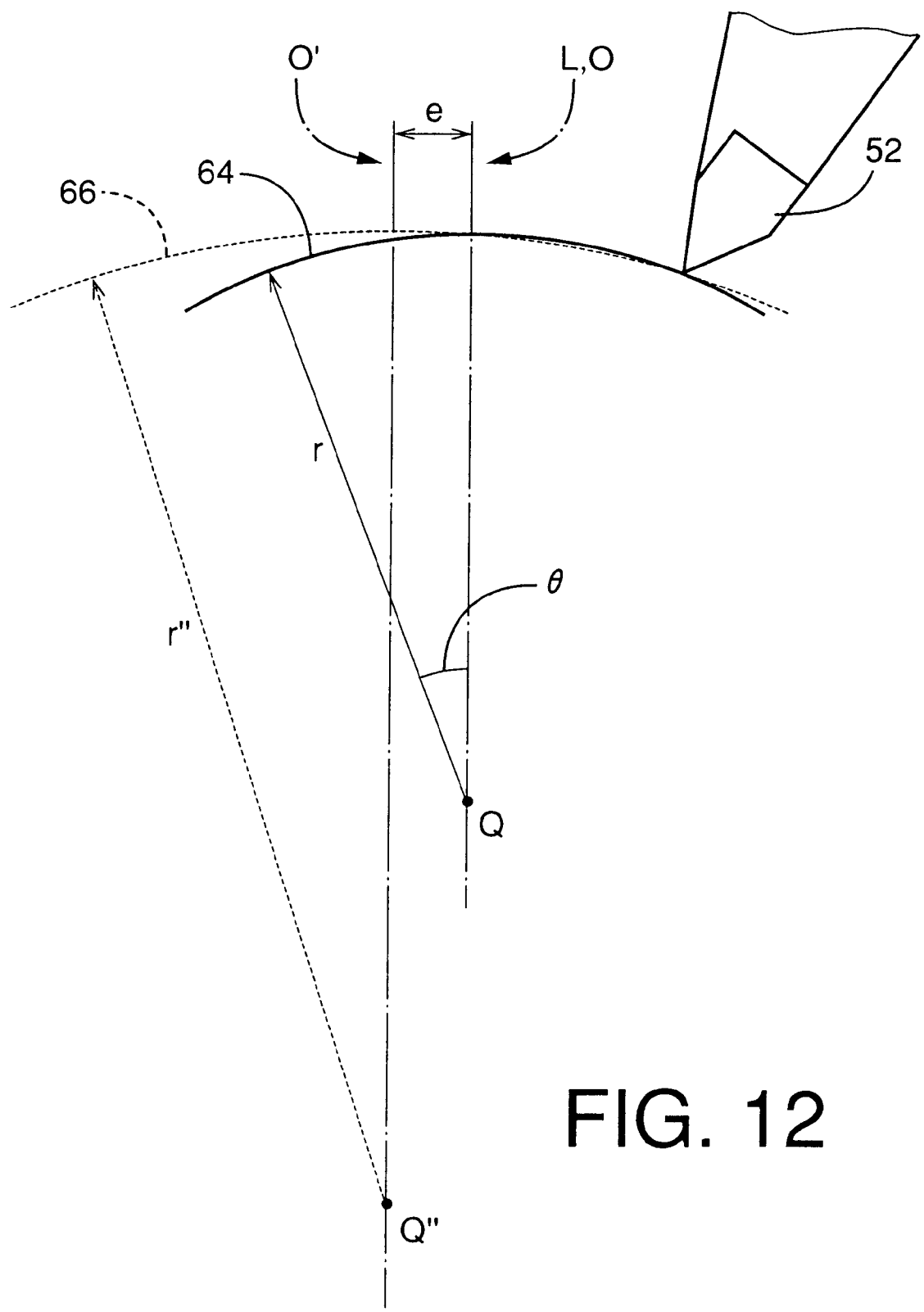
FIGS. 12 and 13 are views explaining a cutting operation effected by the cutting apparatus of FIG. 7 for forming the toric lens surface.
Figure 13:
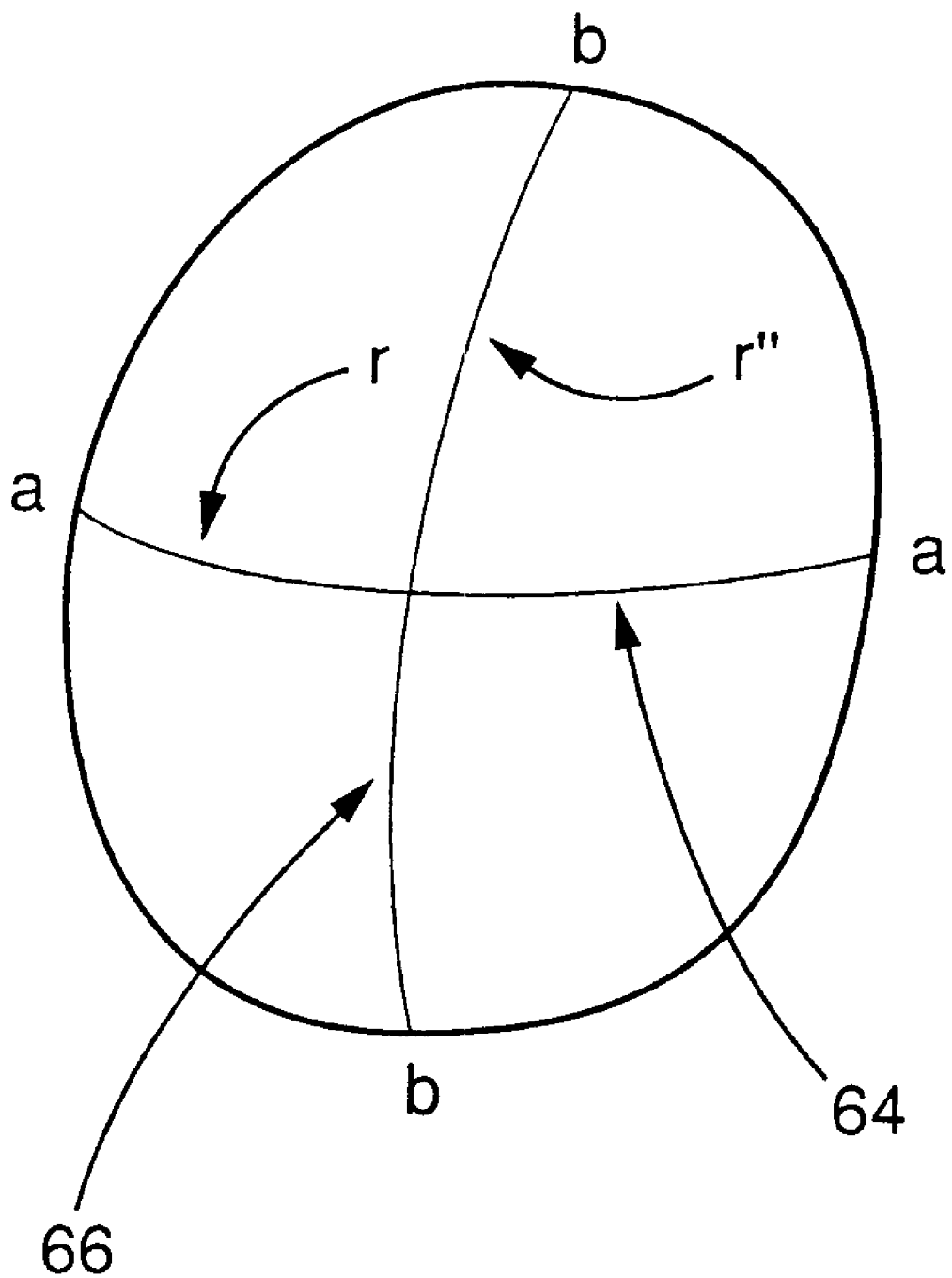

The lens blank 50 is reciprocated by the above-described reciprocating mechanism such that the optical center axis O of the lens blank 50 is reciprocatingly moved relative to the rotation axis L by the eccentricity distance e at the angular interval of 90° about the rotation axis L of the lens blank 50. According to this arrangement, a locus M of the contact point of the cutting edge of the tool 52 with the surfaces 60, 61 during rotation of the lens blank 50 is an ellipse as shown in FIG. 11, wherein a minor dimension on a minor axis a—a of the ellipse corresponding to the reciprocating direction of the lens blank 50 is smaller by an amount corresponding to the above-indicated eccentricity distance e than a major dimension on a major axis b—b of the ellipse. Therefore, when the cutting tool 52 is moved for effecting the cutting operation on the front surface of the lens blank 50 such that the cutting tool 52 moves along the circular arc having the radius of curvature r, the cut surface of the lens blank 50 has an arc 64 with the radius r on the minor axis a—a, as indicated in FIGS. 12 and 13, while on the other hand, the cut surface of the lens blank 50 has an arc 66 with a radius r" on the major axis b—b, as also indicated in FIGS. 12 and 13. The radius r" of the arc 66 is larger than the radius r of the arc 64 by an amount corresponding to the eccentricity distance e of the reciprocating movement of the lens blank 50 relative to the rotation axis L.

The lens surfaces 60, 61 formed by using the present cutting apparatus as described above provide a toric surface which has two mutually perpendicular principal meridians, one of which extends along the above-indicated minor axis a—a and the other of which extends along the major axis b—b, so that the obtained toric surface 60, 61 has the intended cylindrical axis orientation. Further, the toric lens surface 60, 61 formed as described above has the cylindrical optical power corresponding to the above-indicated eccentricity distance e of the reciprocating movement of the lens blank 50 relative to the rotation axis L.

Further, the above-indicated central part-spherical surface 60 and annular part-spherical surface 61 having different radii r, r' are formed in the respective central and annular parts A, B of the front surface of the lens blank, as indicated in FIG. 9, by controlling distance of eccentricity between the center axis of the guide hole of the guide member and the rotation major axis of the chuck support member, in the above-indicated reciprocating mechanism, by moving the guide member relative to the rotation major axis in the direction orthogonal to the rotation major axis. That is, the surfaces 60, 61 are given the respective different radii r, r' by moving the cutting edge of the tool 52 first along the arc which has the center on the arc center axis Q lying on the rotation axis L, and then along the arc which has the center on the arc center axis Q' which also lies on the rotation axis L and which is spaced from the axis Q in a direction away from the front surface of the lens blank 50. According to this arrangement, the cylindrical optical powers which are different from each other are respectively provided in the plurality of parts or regions A and B (FIG. 9) having the respective different radii r, r' of curvature, namely, in the near vision correction region 12 and the distant vision correction region 14 of the presbyopia correction contact lens 10 of the above-described first embodiment, for instance.

By the cutting operation on the lens blank 50 for forming one of the opposite surfaces of the lens to be obtained (e.g., the convex front surfaces 20, 34 of the contact lenses 10, 26 in the above first and second embodiments) by using the present cutting apparatus constructed as described above, both of the spherical optical power and the cylindrical optical power can be made different in the different vision correction regions simultaneously by the single cutting operation. Thus, the intended lens surface can be easily formed by the cutting operation. The other surface of the lens (e.g., the concave back surfaces 18, 32, of the contact lenses 10, 26 in the above first and second embodiments) has a simple part-spherical profile following the profile of the cornea, assuring easy manufacture of the contact lens as well as improved wearing comfort as felt by the lens user.

There has been explained one example of cutting apparatus for performing the cutting operation on the lens blank surface for providing the plurality of vision correction regions having the respective different cylindrical optical powers. A modified cutting apparatus may be used to form the lens surface having the plurality of vision correction regions which also have the respective different cylindrical axis orientations, provided the cutting apparatus is adapted such that a cutting tool opposed to a workpiece (lens blank) clamped by a chuck of the main spindle is movable about an axis perpendicular to the rotation axis of the workpiece. For instance, such a modified cutting apparatus may include: (I) a mechanism for establishing a relative position of the cutting tool and the rotation axis of the workpiece such that the cutting tool is eccentrically offset from the rotation axis at an angular interval of 90° about the axis of the main spindle, to thereby form the intended toric surface with the desired cylindrical optical power; (II) a mechanism for moving the cutting tool in the direction parallel to the rotation axis of the workpiece, relative to the workpiece, so as to change the radius of the circular arc taken by the cutting edge of the cutting tool, to thereby form the intended multifocal lens surface (including bifocal surface); (III) a mechanism for positioning the workpiece relative to the main spindle in the circumferential direction of the workpiece, to obtain the intended optical axis orientation; and (IV) a mechanism for simultaneously controlling the operations by the mechanisms (I)–(III) in accordance with the movements of the cutting tool relative to the workpiece. The thus constructed cutting apparatus permits production of a toric multifocal lens having the desired astigmatism corrective optical powers and presbyopia corrective optical powers which are different in the vision correction regions.

While the present invention has been described in detail in its presently preferred embodiments, it is to be understood that the invention is not limited to the details of the illustrated embodiments, but may be otherwise embodied with various changes, improvements and modifications, which may occur to those skilled in the art, without departing from the scope of the invention defined in the attached claims.

What is claimed is:

1. A toric multifocal lens including a plurality of vision correction regions having centers on a common optical center axis, said plurality of vision correction regions providing respective different values of a spherical optical power, each of said plurality of vision correction regions having an optical power for correction of astigmatism, wherein the improvement comprises:

at least one of a cylindrical optical power and a cylindrical axis orientation which in combination determine said optical power for correction of astigmatism being different in at least two different vision correction regions of said plurality of vision correction regions, so that said at least two different vision correction regions have respective different values of said optical power for correction of astigmatism.

2. A toric multifocal lens according to claim 1, including positional stabilization means for maintaining a predetermined circumferential orientation of said lens on a cornea of a wearer's eye.

3. A toric multifocal lens according to claim 1, wherein an optical portion of one of opposite surfaces of said lens has a part-spherical concave profile following that of said cornea, while an optical portion of the other surface has an aspherical convex profile which gives said respective different values of said spherical optical power in said plurality of vision correction regions and said different values of said optical power for correction of astigmatism in said at least two different vision correction regions.

4. A toric multifocal lens according to claim 1, including toric portions provided on respective opposite surfaces thereof and cooperating with each other to provide said respective different values of said optical power for correction of astigmatism in said at least two different vision correction regions of said plurality of vision correction regions.

5. A method of producing a toric multifocal lens as defined in claim 1, by moving a cutting tool (52) to effect a cutting operation on a surface of a lens blank (50) while said lens blank is rotated about an axis (L) of rotation thereof, such that said cutting tool is moved about an arc center axis (Q, Q') which is perpendicular to said axis of rotation of said lens blank, so that said cutting tool is moved in a plane (X-Y) perpendicular to said arc center axis, along a circular arc (60, 61) having a center on said arc center axis (Q, Q'), said method comprising:

moving said lens blank such that an optical center axis (O, O') of said lens blank being reciprocatingly moved in an offset direction relative to said axis (L) of rotation of said lens blank by a predetermined offset distance (e) at an angular interval of 90° about said axis of rotation while said lens blank is rotated about said axis of rotation;

moving said cutting tool along at least two circular arcs (60, 61) in said plane; and determining at least one of said offset distance and said offset direction of said lens blank, and a radius (r, r') of each of said at least two circular arcs (60, 61), depending upon an angle (θ, θ') of rotation of said cutting tool in said plane (X-Y) about said arc center axis (Q, Q').

6. A cutting apparatus used for producing a toric multifocal lens as defined in claim 1, said system comprising:

a lens blank holder for rotatably holding a lens blank about an axis (L) of rotation thereof, such that an optical center axis (O, O') of said lens blank is reciprocatingly movable in an offset direction relative to said axis of rotation of said lens blank by a predetermined offset distance (e) at an angular interval of 90° about said axis of rotation while said lens blank is rotated about said axis of rotation;

a cutting tool feeding device for holding a cutting tool for effecting a cutting operation on a surface of said lens blank while said lens blank is rotated by said lens blank holder about said axis of rotation thereof, said cutting tool feeding device holding said cutting tool such that said cutting tool is movable about at least two arc center axes (Q, Q') perpendicular to said axis of rotation of said lens blank, in a plane (X-Y) perpendicular to said arc center axes, along respective at least two circular arcs (60, 61) having centers on said at least two arc center axes, respectively; and a control device for controlling at least one of said offset distance and said offset direction of said lens blank, and a radius (r, r') of each of said at least two circular arcs, depending upon an angle of rotation of said cutting tool in said plane (X-Y) about said arc center axes.

7. A method of determining an optical power for correction of astigmatism in a toric multifocal lens as defined in claim 1, including a near vision correction region and a distant vision correction region, said optical power for correction of astigmatism being determined by a combination of a cylindrical optical power and a cylindrical axis orientation, said method comprising:

determining said cylindrical optical power and said cylindrical axis orientation in said near vision correction region, based on astigmatic data on an eye of a wearer of said toric multifocal lens measured during viewing of near objects, and determining said cylindrical optical power and said cylindrical axis orientation in said distant vision correction region, based on astigmatic data on said eye measured during viewing of distant objects.

* * * * *